Patented June 2, 1936

2,042,484

UNITED STATES PATENT OFFICE 2,042,484

PROCESS FOR THE PREPARATION OF LOW SUBSTITUTED CELLULOSE SULPHATES

Leon Rubenstein, Briar Wood, Saltcoats, Scotland, assignor to Imperial Chemical Industries Limited, a corporation of Great Britain No Drawing. Application May 18, 1934, Serial No. 726,287. In Great Britain May 30, 1933

12 Claims. (Cl. 260—100)

The present invention relates to the preparation of cellulose esters and more particularly to the preparation of new sulphates of cellulose containing only a small proportion of the sulphate group.

It is known that cellulose derivatives valuable in the arts may be obtained by the interaction of relatively small proportions of etherifying agents upon cellulose, and that the solutions of these derivatives in dilute alkali may be used for the preparation of films, artificial threads, and the like. These derivatives are insoluble in water and in organic solvents.

The hitherto known cellulose sulphates have been materials soluble in water, but the solubility of the cellulose sulphates of the present invention, resembles that of the above ether derivatives, and the new sulphates have properties rendering them valuable in the arts for several purposes to which viscose may be applied.

More especially, the new sulphates of the present invention may be dissolved in sodium hydroxide solutions of around 10% concentration, either by simple mixing with the alkaline solution at ordinary temperature, or reduced temperatures or by freezing a mixture of the new sulphate with the alkaline solution until crystals of ice appear, and then allowing the temperature to rise to room temperature, when the new sulphate is such that it fails to dissolve by simple mixture with the alkaline solution. It may sometimes be brought into solution by dispersion with the help of suitable colloids or dispersing agents or by mechanical dispersion of the solution in a colloid mill instead of by withdrawal of sufficient heat to cause the formation of ice crystals and subsequent warming of the magma to room temperature.

Films, artificial threads, and the like may thus be prepared by coagulating with acid or salt solutions a clear solution of the product in alkali prepared by one of these methods, if desired, after filtration. The alkaline solution may also be used for the purposes of cloth filling and finishing in conjunction with filling materials and the like.

This invention has as an object the preparation of low substituted cellulose sulphates. A further object is the preparation of films, caps, bands, filaments, and the like. Still further objects are the new articles of manufacture thus prepared. Other objects will appear hereinafter.

These objects are accomplished by the following invention wherein a cellulosic substance is caused to react at a temperature not higher than about 70° C. and at a suitable pressure, with not more than about ½ molecular proportion of the sulphating agent for every $C_6H_{10}O_5$ unit of cellulose in presence of a base. The reaction may be carried out with or without the addition of a catalyst, either in the presence or absence of a diluent. The cellulose may be employed in the form of alkali cellulose, in which case the necessary base is constituted by the alkali present, and a further basic material is not usually necessary.

As suitable esterifying agents there may be mentioned sulphuryl chloride, which, however, must be used in conjunction with a strong base, as for instance, when semi-moist soda cellulose is used. Chlorsulphonic acid is also suitable, and is best used in conjunction with pyridine, dimethylaniline, picoline, quinoline, or similar tertiary amines. When using sulphuryl chloride it is preferred to treat the soda cellulose first with a small proportion of chloracetic acid up to ⅛ molecular proportion before introducing the sulphuryl chloride. Sulphur trioxide, and pyrosulphuric acid may also be used as sulphating agents.

As cellulosic substances suitable for use in the processes of the present invention there may be mentioned, wood pulp, cotton linters, very low substituted ethyl, methyl, benzyl, glycol, etc., cellulose, cellulose pretreated with formic acid, etc.

The following examples illustrate, but do not limit the invention.

Example 1

Two hundred sixteen parts of air-dry cellulose in the form of sulphite wood boards containing about 85% of alpha-cellulose (dry weight) are mercerized for one hour in 20% caustic soda solution at 18° C., the resulting mass pressed to 500 parts and shredded at 13°–15° C. for 2½ hours in a Werner Pfleiderer mixer. The soda cellulose so obtained is cooled at 5° C. in an incorporator fitted with an agitator. Forty-two parts of sulphuryl chloride dissolved in 200 parts of dry benzene and cooled to 5° C. are added slowly so that there is practically no rise of temperature. Stirring is maintained throughout the addition. When all the reagent has been introduced, the temperature is raised to 80°–85° C. and kept there for 8 hours, the mass being stirred during this period.

The product is purified by extracting the water soluble material with water and washing with water. The purified material is best stored in the moist state.

A solution of the product in caustic soda can be obtained as follows:

Sufficient of the product is added to 10% caustic soda solution to give a 4% solution of the cellulose ester (calculated on dry weight) and the mixture stirred and cooled to −10° to −15° C. until ice crystals appear. The mass is then allowed to warm gradually to room temperature. The solution so formed can, after the removal of the residue by filtration or centrifuging, be used for the preparation of tubes, caps, bands, films, or threads, e. g., by coagulating thin sheets or rods with a coagulating agent, such as sulphuric acid.

*Example 2*

Two hundred sixteen parts of air-dry alpha wood boards containing 8% of moisture, are shredded in a Werner-Pfleiderer or other suitable incorporator for 24 hours with 388 parts of 20% caustic soda. The soda cellulose so obtained is kept at about 20° C. for 18 hours, and then cooled to 0° C. in a vessel fitted with a stirrer. Forty-two parts of sulphuryl chloride dissolved in 200 parts of dry benzene are added with care so that the temperature does not rise appreciably. When the addition is complete, stirring is continued at 0° C. for 7 hours.

After ageing the mass for 3 days at atmospheric temperature, the product is isolated by acidifying with 2.5% sulphuric acid and purified by washing with water. The product which is best stored in the moist state, has a sulphate content of nearly 1% on the weight of the dry material.

A solution of the product in caustic soda solution can be prepared as described in Example 1.

*Example 3*

Sixty parts of shredded semi-moist soda cellulose prepared as in Example 1 are treated with 1.5 parts chloroacetic acid and the mixture is worked in the Werner Pfleiderer mixer for ¾ hour at room temperature. 4.2 parts of sulphuryl chloride are then added and the mixture is again worked for ½ hour at room temperature. The temperature is then raised to 60° C., agitation being continued for 1¾ hours at this temperature. The mixture is then introduced into an excess of 2.5% sulphuric acid and the cellulose sulphate so obtained is filtered off and purified by washing with water. In order to form a solution, the product is mixed with 20 times its weight of 10% caustic soda solution and the mixture cooled to −5° C., being well stirred at that temperature. On allowing the temperature to rise again to room temperature, a solution is obtained which may, if desired, be filtered. Films obtained by treating soda cellulose prepared as in Example 1 with chloroacetic acid (⅛ mol. per $C_6$ unit of the cellulose) and then with sulphuryl chloride (¼ mol. per $C_6$ unit of the cellulose) under the conditions of Example 3 show a tensile strength of approximately 8000 pounds per square inch.

The above description and examples are intended to be illustrative only. Any modification of or variation therefrom which conforms to the spirit of the invention is intended to be included within the scope of the claims.

I claim:

1. Process for the preparation of cellulose sulphates insoluble in water but capable of being dissolved in dilute aqueous sodium hydroxide solution by cooling a mixture thereof until crystals of ice appear, and then allowing the temperature to rise to room temperature, which comprises treating a substance having the cellulosic nucleus and containing esterifiable hydroxyls with up to ½ molecular proportion of a sulphating agent per $C_6H_{10}O_5$ unit of the cellulose in the presence of a base of the class consisting of caustic soda and tertiary cyclic amines.

2. Process for the preparation of cellulose sulphates insoluble in water but capable of being dissolved in dilute aqueous sodium hydroxide solution by cooling a mixture thereof until crystals of ice appear, and then allowing the temperature to rise to room temperature, which comprises treating semi-moist soda cellulose with up to ½ molecular proportion of sulphuryl chloride per $C_6H_{10}O_5$ unit of the cellulose.

3. The process of claim 2 wherein the soda cellulose is treated until up to ⅛ molecular proportion of chloroacetic acid and then with sulphuryl chloride.

4. Cellulose sulphates capable of being dissolved in 10% aqueous sodium hydroxide by freezing a mixture thereof with the alkaline solution until crystals of ice appear, and then allowing the temperature to rise to room temperature, said cellulose sulphates being prepared according to the process of claim 1.

5. Process for preparing solutions, which comprises dissolving cellulose sulphate as prepared by the process of claim 1 in dilute aqueous caustic soda.

6. A process which comprises mixing soda cellulose with about ⅛ mol. chloracetic acid per $C_6$ unit of the cellulose and reacting the thus treated cellulose with ¼ mol. of sulphuryl chloride at about 60° C. for about 1¾ hours.

7. A process which comprises reacting cellulose, pretreated with chloroacetic acid, with not more than about ½ mol. of sulphuryl chloride in the presence of a base of the class consisting of caustic soda and tertiary cyclic amines at temperatures below 70° C.

8. Process for the preparation of cellulose sulphates insoluble in water but capable of being dissolved in dilute aqueous sodium hydroxide solution by cooling a mixture thereof until crystals of ice appear, and then allowing the temperature to rise to room temperature, which comprises reacting cellulose with not more than about ½ mol. of a sulphating agent in the presence of a base of the class consisting of caustic soda and tertiary cyclic amines at temperatures below 70° C.

9. Cellulose sulphates capable of being dissolved in 10% aqueous sodium hydroxide by freezing a mixture thereof with the alkaline solution until crystals of ice appear, and then allowing the temperature to rise to room temperature, said cellulose sulphates being prepared according to the process of claim 2.

10. Process for preparing solutions, which comprises dissolving cellulose sulphate as prepared by the process of claim 2 in dilute aqueous caustic soda.

11. Process which comprises reacting cellulose pretreated with chloroacetic acid, with not more than about ½ mol. of sulphuryl chloride in the presence of sodium hydroxide at temperatures below 70° C.

12. Process for the preparation of cellulose sulphates insoluble in water but capable of being dissolved in dilute aqueous sodium hydroxide solution by cooling a mixture thereof until crystals of ice appear, and then allowing the temperature to rise to room temperature, which comprises reacting cellulose with not more than about ½ mol of a sulphating agent in the presence of sodium hydroxide at temperatures below 70° C.

LEON RUBENSTEIN.